O. KNUDSON.
BREAD CUTTER.
APPLICATION FILED JAN. 21, 1916.

1,181,016.

Patented Apr. 25, 1916.
3 SHEETS—SHEET 1.

Witnesses
E. C. Ardeeser Jr.
J. C. Wilcox

Inventor
Ole Knudson,
By Victor J. Evans
Attorney

O. KNUDSON.
BREAD CUTTER.
APPLICATION FILED JAN. 21, 1916.

1,181,016.

Patented Apr. 25, 1916.
3 SHEETS—SHEET 2.

Witnesses

Inventor
Ole Knudson,
By Victor J. Evans
Attorney

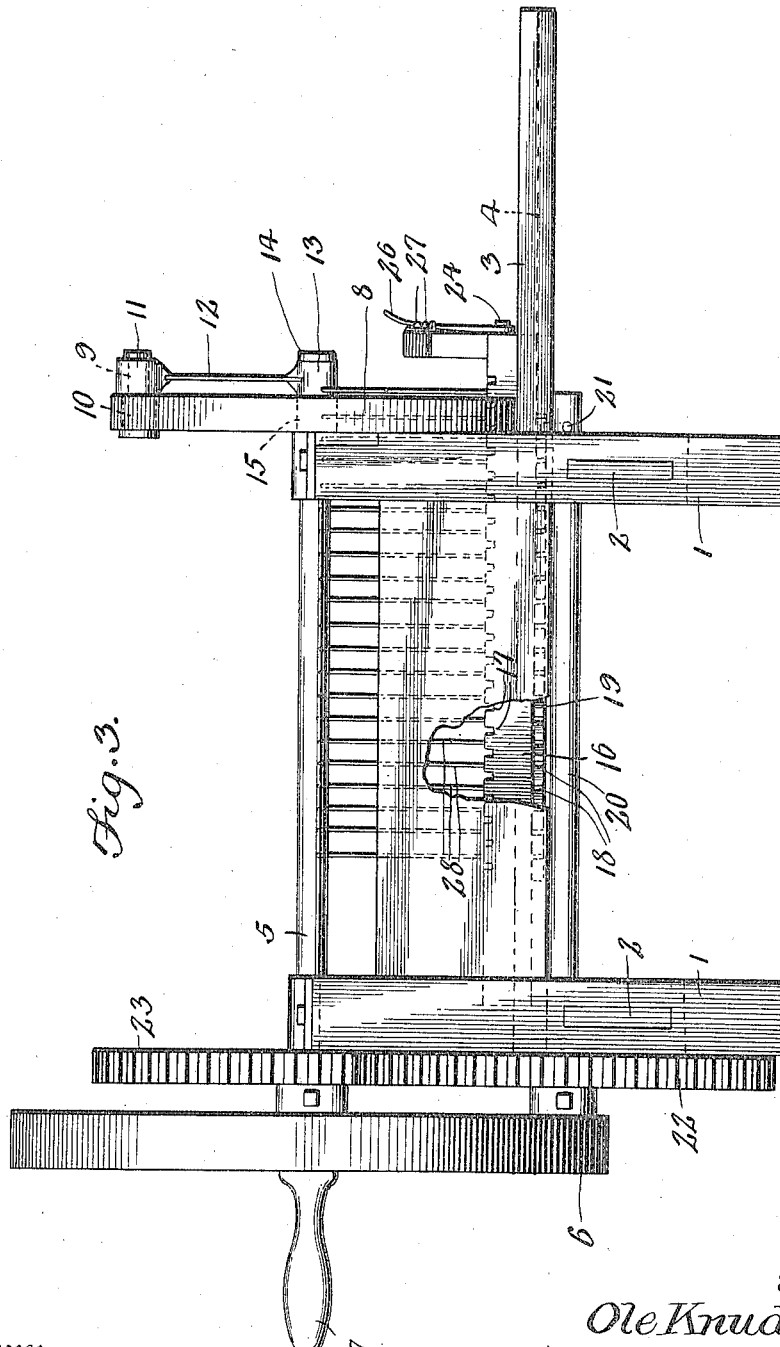

UNITED STATES PATENT OFFICE.

OLE KNUDSON, OF BELLINGHAM, WASHINGTON.

BREAD-CUTTER.

1,181,016.  Specification of Letters Patent.  Patented Apr. 25, 1916.

Application filed January 21, 1916. Serial No. 73,412.

*To all whom it may concern:*

Be it known that I, OLE KNUDSON, a citizen of the United States, residing at Bellingham, in the county of Whatcom and State of Washington, have invented new and useful Improvements in Bread-Cutters, of which the following is a specification.

This invention relates to bread cutters and it consists in the novel features hereinafter described and claimed.

An object of the invention is to provide a cutter of the character indicated which is adapted to be easily and readily used for severing a loaf of bread into slices of predetermined thickness there being provided upon the table of the cutter means for holding each individual slice irrespective of the diameter of the loaf.

The cutter also includes a knife mounted for reciprocatory movement and having a guide for the same which imparts to the knife a shearing cut as it passes transversely through the loaf.

Figure 1:
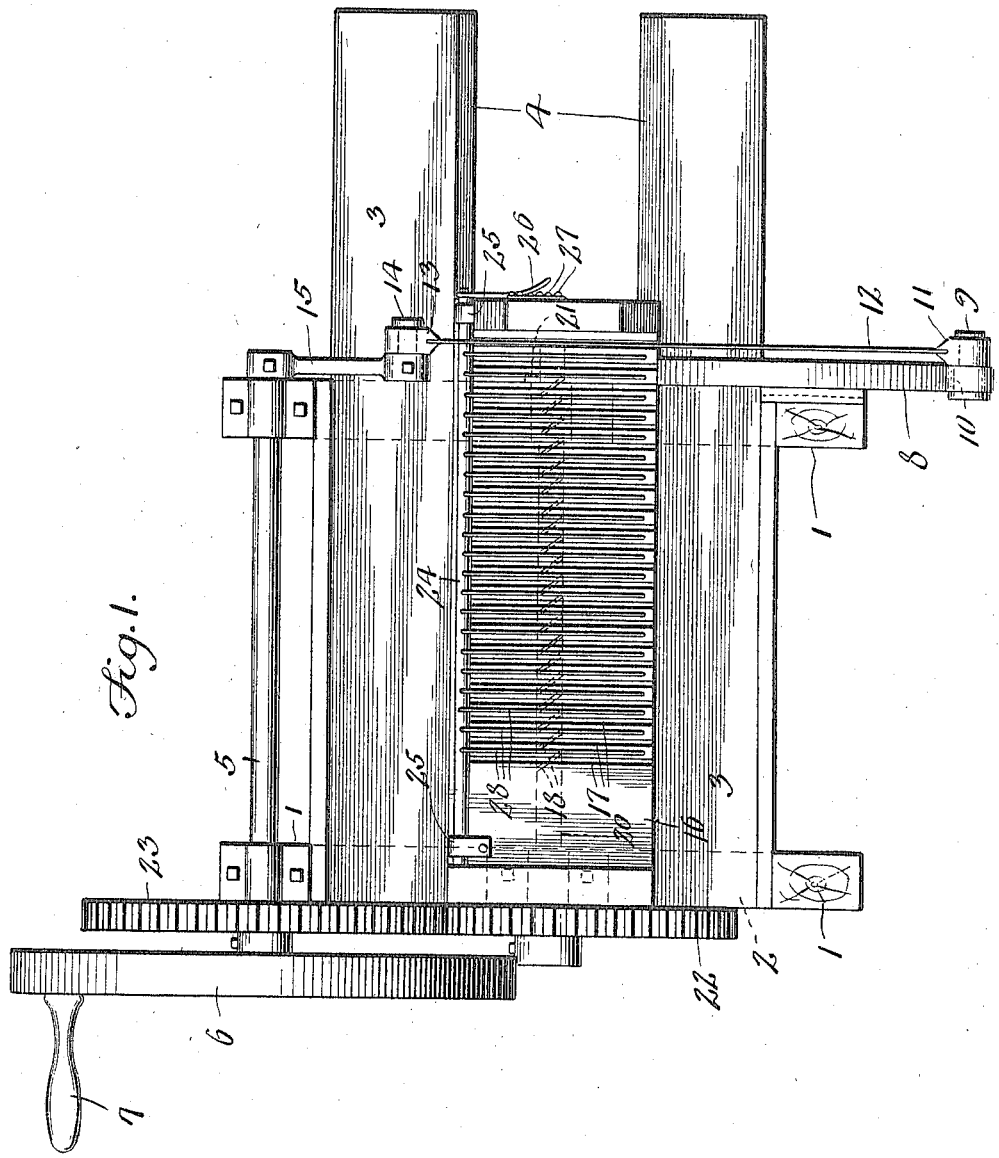
Figure 2:
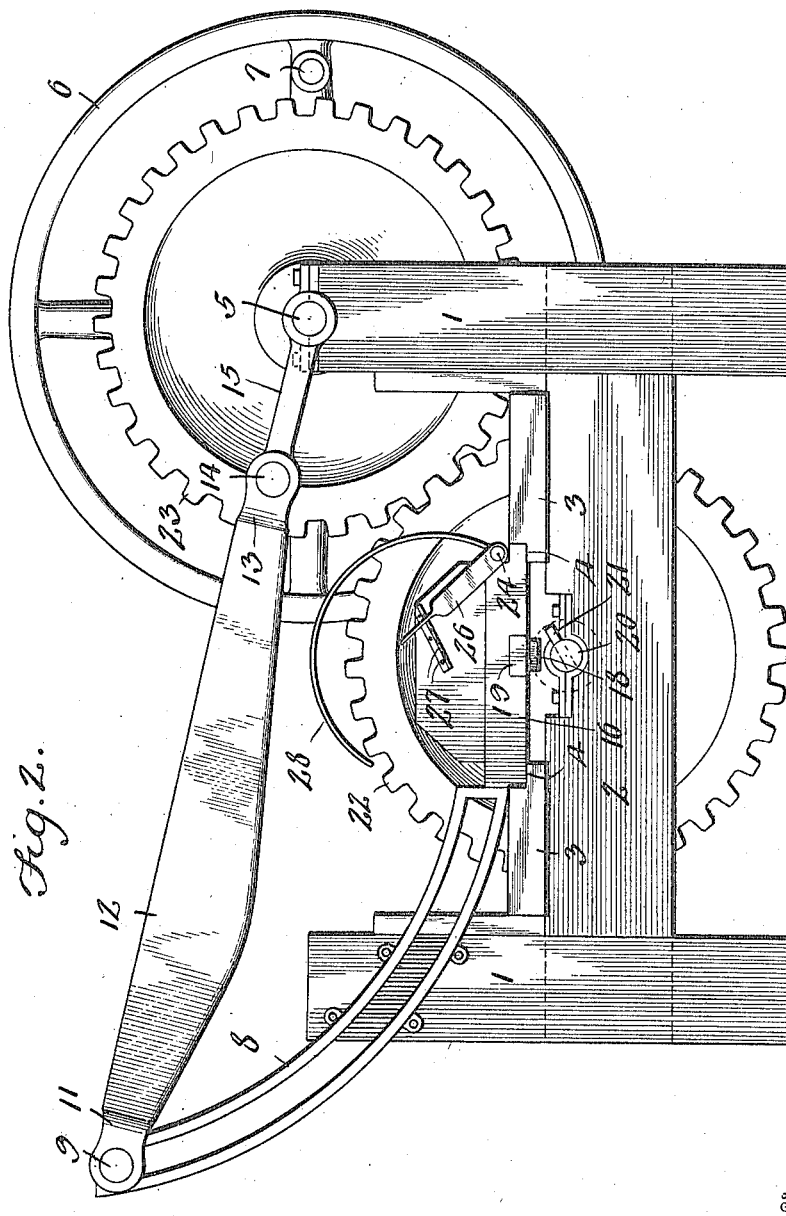

In the accompanying drawing: Figure 1 is a top plan view of the bread cutter, Fig. 2 is an end elevation of the same, Fig. 3 is a side view of the same with parts broken away.

The bread cutter includes a frame consisting of legs 1 which are connected together by cross bars 2. Panels 3 are mounted upon the cross bars 2 and are spaced from each other. The said panels are provided at their inner edges with ledges 4. A shaft 5 is journaled upon two of the legs 1 and carries at one end a fly wheel 6 provided at its outer side with an eccentrically positioned handle 7. A curved guide 8 is mounted upon one of the legs 1 and receives a pin 9 upon which is journaled a roller 10 which is adapted to travel in the slot of the guide 8. A bearing 11 is journaled upon the pin 9 and one end of a knife blade 12 is attached to the said bearing and the other end of the said blade is attached to a bearing 13 which is journaled upon a pin 14 mounted at the free end of a crank arm 15 which in turn is mounted upon the shaft 5.

A table 16 is slidably mounted upon the ledges 4 of the panels 3 and the said table is provided at its upper side with a series of transversely disposed grooves 17. The table 16 is provided at its under side with a rack bar 19 having a series of teeth 18 which are disposed at an acute angle to the median longitudinal dimension of the table 16.

A shaft 20 is journaled for rotation in the cross bars 2 and is located under the table 16. The shaft is provided with an outstanding pin 21 which is adapted to engage the teeth 18 of the rack bar 19 whereby the table 16 is moved longitudinally, step by step, during the successive rotations of the shaft 20. A gear wheel 22 is fixed to the shaft 20 and meshes with a gear wheel 23 fixed upon the shaft 5. A bar 24 is turnably mounted in bearings 25 mounted at one side edge of the table 16 and the said bar is provided at one end with a resilient handle 26 adapted to engage lugs 27 mounted at the end of the table 16. Resilient rods 28 are mounted upon the bar 24 and are located approximately midway between the grooves 17 of the table 16.

In operation the loaf of bread which is to be severed into slices is placed upon the upper surface of the table 16 and an operator by using the handle 7 rotates the shaft 5 whereby the crank arm 15 is carried around the axis of the said shaft 5. During this movement on the part of the arm 15 the knife blade 12 is reciprocated back and forth across the table 16 and the curvature of the guide 8 is such as to cause the knife blade 12 to pass through the loaf and to impart to the same a shearing cut as the loaf is reduced to slices. As the pin 9 approaches the nearer edge of the table 16 the lower or cutting edge of the knife 12 enters one of the grooves 17 in the upper surface of the table thus the knife completely severs the slice from the body of the loaf. At the same time the shaft 20 is rotated from the shaft 5 by the intermeshing gear wheels 22 and 23 and the pin 21 is carried around and engages the teeth 18 and thus as each slice is cut from the loaf the table 16 is moved step by step along the panels 3 and an uncut portion of the loaf is brought into the path of the knife blade 12 upon the next longitudinal movement of the said knife blade. As each slice is cut from the body of the loaf it is retained in position upon the upper surface of the table 16 by one of the rods 28 and inasmuch as the said rods 28 are flexible they will hold the cut slices in position upon the upper surface of the table 16 irrespective of the diameter of the loaf.

From the above description taken in conjunction with the accompanying drawing it will be seen that a bread slicer or cutter of simple and durable form is provided and that the same may be easily and quickly used for reducing a loaf to slices of a predetermined thickness.

Having described the invention what is claimed is:

1. A bread cutter comprising a frame, a table mounted for movement along the frame, a knife blade mounted for movement transversely of the table, means for reciprocating the knife blade and for advancing the table along the frame, a bar turnably mounted upon the table and resilient rods carried by the bar and adapted to engage the bread upon the table.

2. A bread cutter comprising a frame, a table mounted for movement along the frame, a knife blade mounted for movement transversely of the table, means for reciprocating the knife blade and for advancing the table along the frame, a bar turnably mounted upon the table, spaced lugs mounted upon the table, a resilient handle carried by the bar and adapted to engage the lugs, and resilient rods mounted upon the bar and adapted to engage the bread upon the table.

In testimony whereof I affix my signature in presence of two witnesses.

OLE KNUDSON.

Witnesses:
CHAS. A. SATHER,
NORMA BEARD.

Copies of this patent may be obtained for five cents each, by addressing the "Commissioner of Patents, Washington, D. C."